(12) United States Patent
Torres et al.

(10) Patent No.: US 11,811,214 B2
(45) Date of Patent: Nov. 7, 2023

(54) MODULAR HOUSING FOR INTEGRATION WITH CIRCUIT BREAKER PANEL

(71) Applicant: Verdigris Technologies, Inc., Mountain View, CA (US)

(72) Inventors: Diego Torres, Mountain View, CA (US); Anjali Sehrawat, Mountain View, CA (US)

(73) Assignee: Verdigris Technologies, Inc., Mountain View, CA (US)

( * ) Notice: Subject to any disclaimer, the term of this patent is extended or adjusted under 35 U.S.C. 154(b) by 1491 days.

(21) Appl. No.: 16/100,103

(22) Filed: Aug. 9, 2018

(65) Prior Publication Data
US 2020/0350755 A1 Nov. 5, 2020

Related U.S. Application Data

(60) Provisional application No. 62/543,334, filed on Aug. 9, 2017.

(51) Int. Cl.
| | |
|---|---|
| *H02H 3/08* | (2006.01) |
| *H04Q 9/00* | (2006.01) |
| *G01D 4/00* | (2006.01) |
| *H02B 1/26* | (2006.01) |
| *H01R 9/26* | (2006.01) |
| *H02J 13/00* | (2006.01) |

(52) U.S. Cl.
CPC ............... *H02H 3/08* (2013.01); *G01D 4/002* (2013.01); *H01R 9/2658* (2013.01); *H02B 1/26* (2013.01); *H02J 13/00016* (2020.01); *H04Q 9/00* (2013.01); *H04Q 2209/60* (2013.01)

(58) Field of Classification Search
CPC ...... G06F 1/181; G06F 1/1632; G06F 1/1656; G11B 33/128; H01L 23/5385; H02H 3/08; G01D 4/002; H01R 9/2658; H02B 1/26; H02J 13/00016; H04Q 9/00; H04Q 2209/60
USPC .......................................................... 361/730
See application file for complete search history.

(56) References Cited

U.S. PATENT DOCUMENTS

| | | | | |
|---|---|---|---|---|
| 5,424,587 | A * | 6/1995 | Federowicz | H02J 13/00028 340/310.18 |
| 7,009,379 | B2 * | 3/2006 | Ramirez | H02J 3/14 324/142 |
| 2007/0263346 | A1* | 11/2007 | Rubin | H01R 25/003 361/641 |
| 2018/0109047 | A1* | 4/2018 | Hoang | G01R 22/066 |
| 2018/0198247 | A1* | 7/2018 | Klein | H02B 1/26 |

* cited by examiner

*Primary Examiner* — Timothy J Thompson
*Assistant Examiner* — Michael F McAllister
(74) *Attorney, Agent, or Firm* — Procopio, Cory, Hargreaves & Savitch LLP

(57) ABSTRACT

A data acquisition module including a connection panel subassembly having a housing, a computing device subassembly, electrically coupled to the connection panel and having a housing configured to mechanically couple to the housing of the connection panel assembly; and a user interface subassembly, electrically coupled to the computing device subassembly and having a housing configured to mechanically couple to the housing of the computing device assembly.

20 Claims, 14 Drawing Sheets

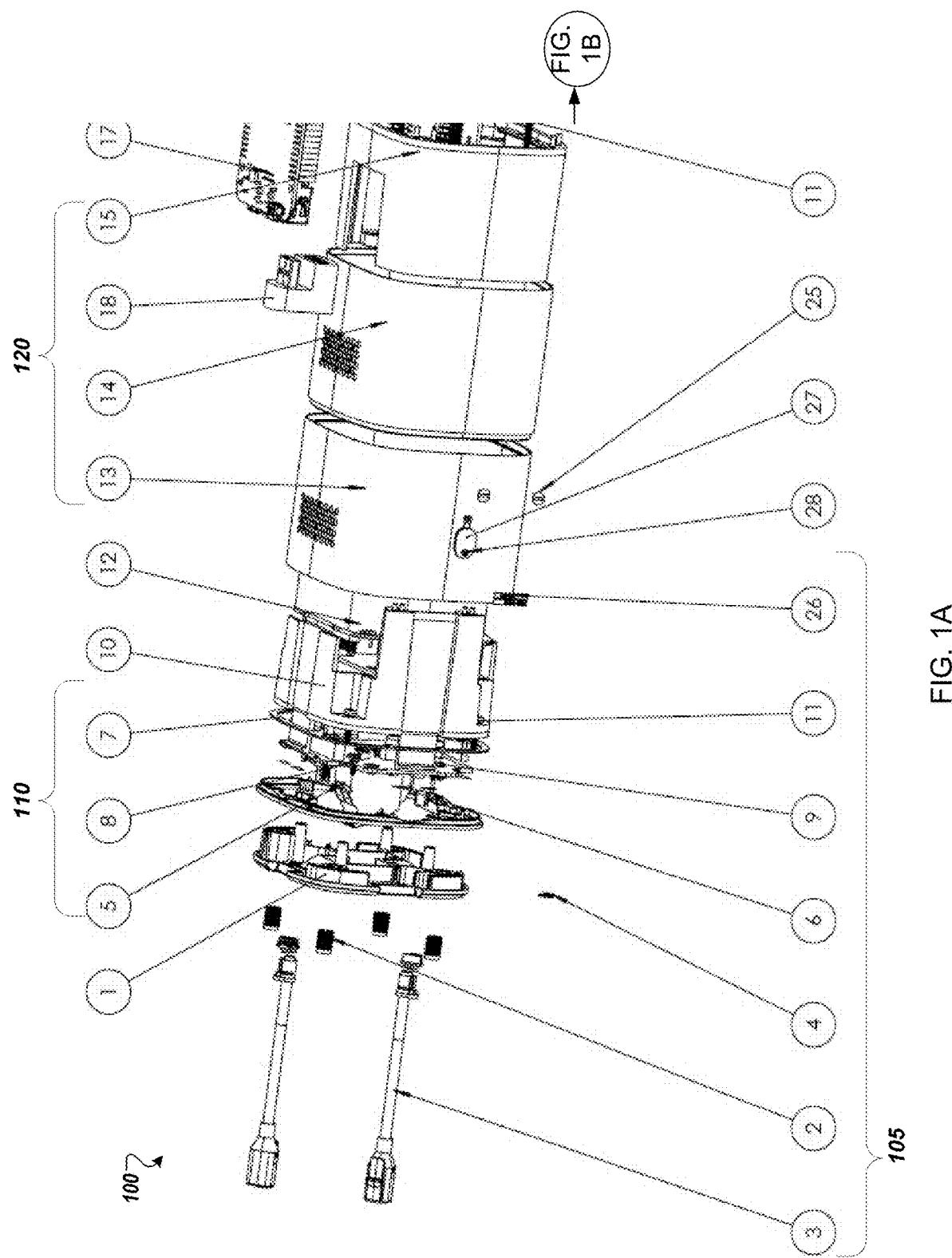

MODULAR HOUSING FOR INTEGRATION WITH CIRCUIT BREAKER PANEL

CROSS-REFERENCE TO RELATED APPLICATIONS

This application claims benefit of priority from Provisional U.S. Patent application Ser. No. 62/543,334, filed Aug. 9, 2017, the contents of which are incorporated by reference.

BACKGROUND

Field

The present disclosure relates to power systems, and more specifically, to a modular data acquisition module for smart metering system.

Related Art

In related art systems, electric metering may be used to determine how much electricity a consumer is using. In older related art systems, metering was typically accomplished through the use of an electricity meter attached to a power line between a building (home, business, or otherwise) and the electric company. However, such systems often could only provide information about total energy usage for the entire building and could not provide information about energy consumption associated with specific circuits within the building.

Related art smart metering systems were developed to analyze individual circuits within a building by connecting a sensor to each circuit, often at the circuit breaker box. However, circuit breaker boxes often provide limited space for installation of data acquisition modules and related art systems may require extensive installation of sensors and data handling modules cluttering the circuit box or requiring installation of additional conduit and junction boxes.

SUMMARY

Aspects of the present application may include a data acquisition module. The data acquisition module may include a connection panel subassembly having a housing, a computing device subassembly, electrically coupled to the connection panel and having a housing configured to mechanically couple to the housing of the connection panel assembly; and a user interface subassembly, electrically coupled to the computing device subassembly and having a housing configured to mechanically couple to the housing of the computing device assembly.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 1A and 1B illustrate an exploded perspective view of a data acquisition module in accordance with aspects of the present disclosure;

DETAILED DESCRIPTION

Figure 1B:
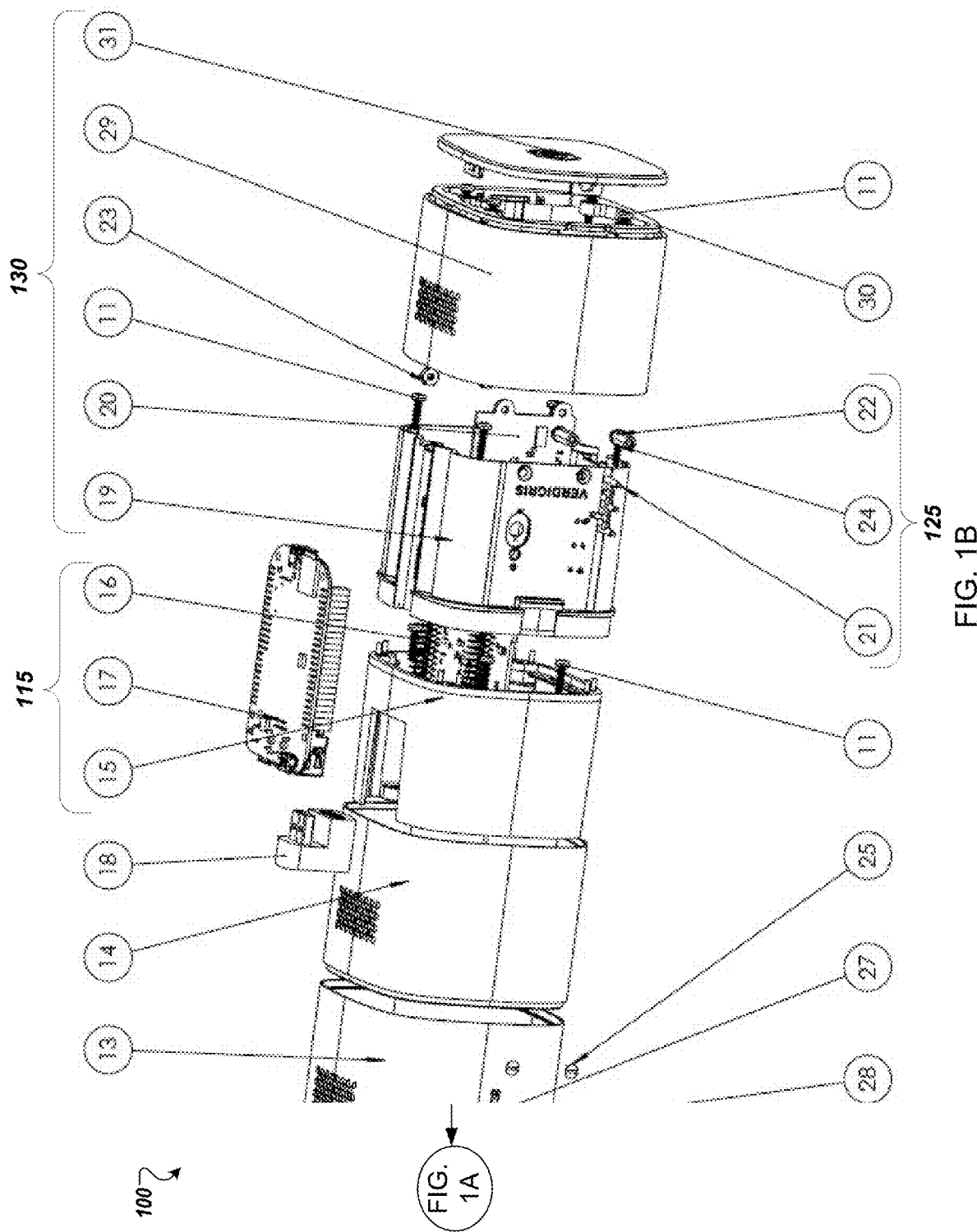

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application.

FIGS. 1A and 1B illustrate an exploded perspective view of a data acquisition module (DAM) 100 in accordance with aspects of the present disclosure. The exploded perspective view has been separated into two figures to allow the subcomponents of the DAM 100 to be observable. As illustrated, the DAM 100 may include a connection panel subassembly 105 configured to connect to one or more electrical sensors that may be connected to an electrified cable. The connection panel subassembly 105 is discussed in greater detail below with respect to FIG. 3.

The DAM 100 also includes a power light ring subassembly 110 that may be used to indicate a power state of the DAM 100. The power light ring subassembly 110 is discussed in greater detail below with respect to FIG. 2.

Figure 13:
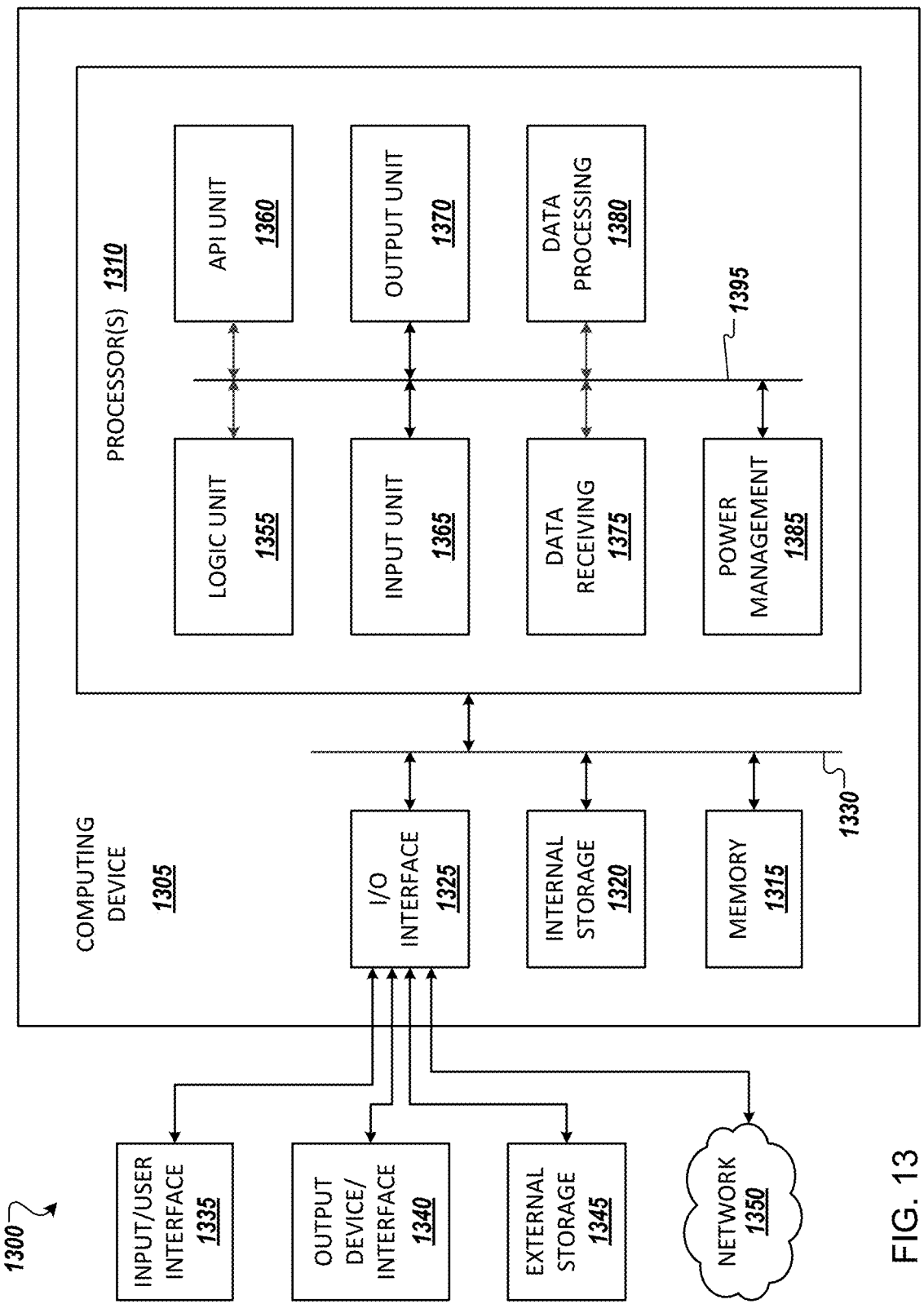
FIG. 13 illustrates an example computing environment with an example computer device suitable for use in some example implementations of the present application.

Further, the DAM 100 also includes an on-board computing subassembly 115 configured to control the DAM 100 and allow the DAM 100 to communicate with other DAMS or with another computing device, such as computing device 1305 illustrated in FIG. 13. The on-board computing subassembly 115 is discussed in greater detail below with respect to FIGS. 4A and 4B.

Additionally, the DAM 100 also includes a middle subassembly 120 to enclose the on-board computing subassembly 115. The middle subassembly 120 is discussed in greater detail below with respect to FIG. 5.

The DAM 100 also includes a user interface (UI) subassembly 125 to provide information to a user. The UI subassembly 125 is discussed in greater detail below with respect to FIG. 7.

The DAM 100 further includes a bottom subassembly 130 to enclose the UI subassembly 125. The bottom subassembly 130 is discussed in greater detail below with respect to FIG. 8.

Figure 2:
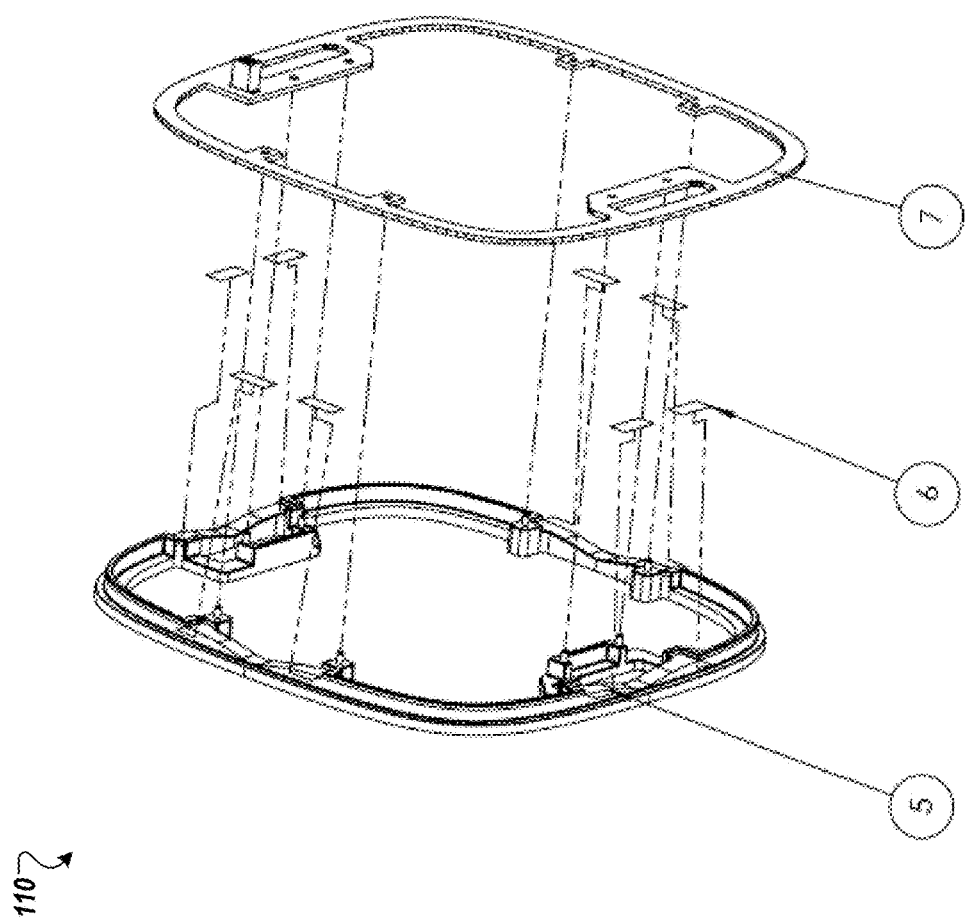
FIG. 2 illustrates an exploded perspective view of a power light ring subassembly of a data acquisition module in accordance with aspects of the present disclosure.

FIG. 2 illustrates an exploded perspective view of a power light ring subassembly 110 of the DAM 100 in accordance with aspects of the present disclosure. The power light ring subassembly 110 may include a plastic support ring to service a rigid support for a light emitting diode (LED) Ring 7 that may be used to indicate a power status of the DAM 100. The LED ring 7 may be electrically coupled to, and controlled by, the on-board computing subassembly 115. Additionally, a plurality of reflective pieces 6 such as reflective tape may be provided adjacent to the LED ring 7 to provide directionality to any light emitted by the LED ring 7 to improve visibility.

Figure 3:
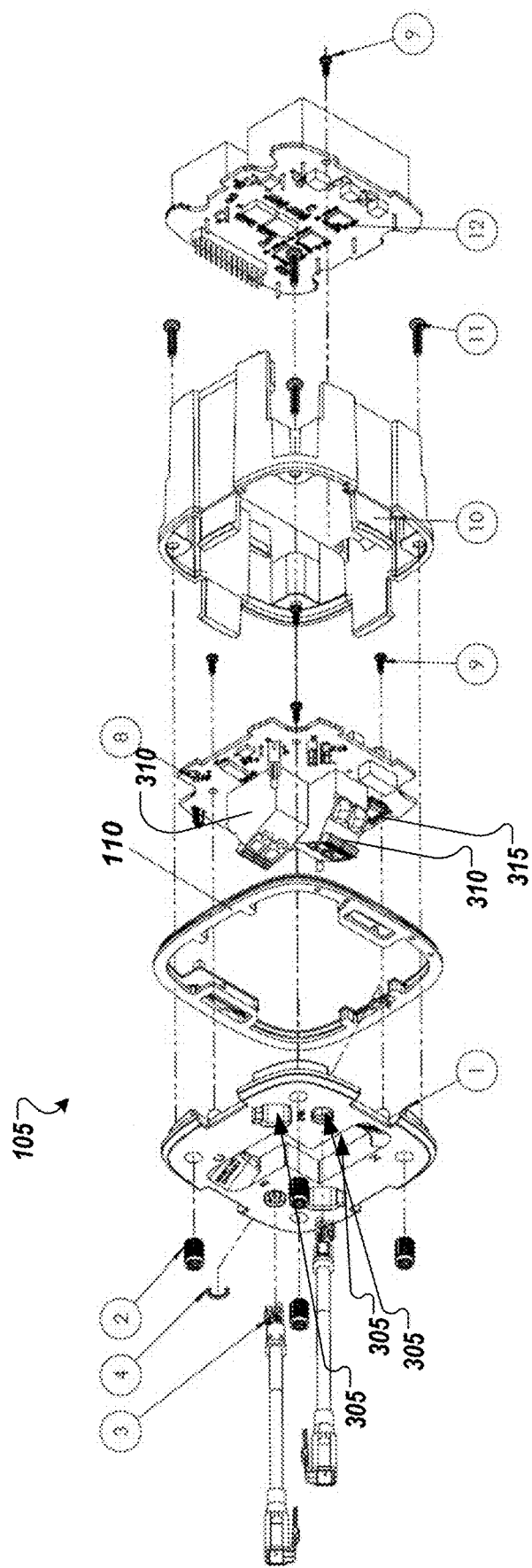
FIG. 3 illustrates an exploded perspective view of a connection panel subassembly of a data acquisition module in accordance with aspects of the present disclosure.

FIG. 3 illustrates an exploded perspective view of a connection panel subassembly 105 of DAM 100 in accordance with aspects of the present disclosure. The connection panel subassembly 105 may include a connection face 1 having openings 305 through which signal cables 3 and terminal blocks 310 from terminal board 8 may be inserted. Once inserted, the signal cables 3 may be retained in the connection face 1 by one or more retaining rings 4. The power light ring subassembly 110 may surround the edge of the connection face 1 and be held in place by the terminal board 8 that is secured to the connection face by a plurality of screws 9.

The terminal board 8 may send and receive signals via the signal cables 3 and/or the terminal blocks 310. The terminal board 8 may also include one or more connectors 315, such as a mini-high density media interface (HDMI) connector, a mini-universal serial bus (USB) connector, a micro USB connector, or any other connector that might be apparent to a person of ordinary skill in the art.

Connection panel subassembly 105 may also include a housing 10 that secures to the connection face 1 by one or more screws 11. Within the housing 10, a circuit board 12 may be provided. The circuit board 12 may be electrically coupled to the terminal board 8 to receive and send signals to the terminal board 8 and process the received signals prior to communicating the signals to the on-board computing subassembly 115.

Figure 4A:
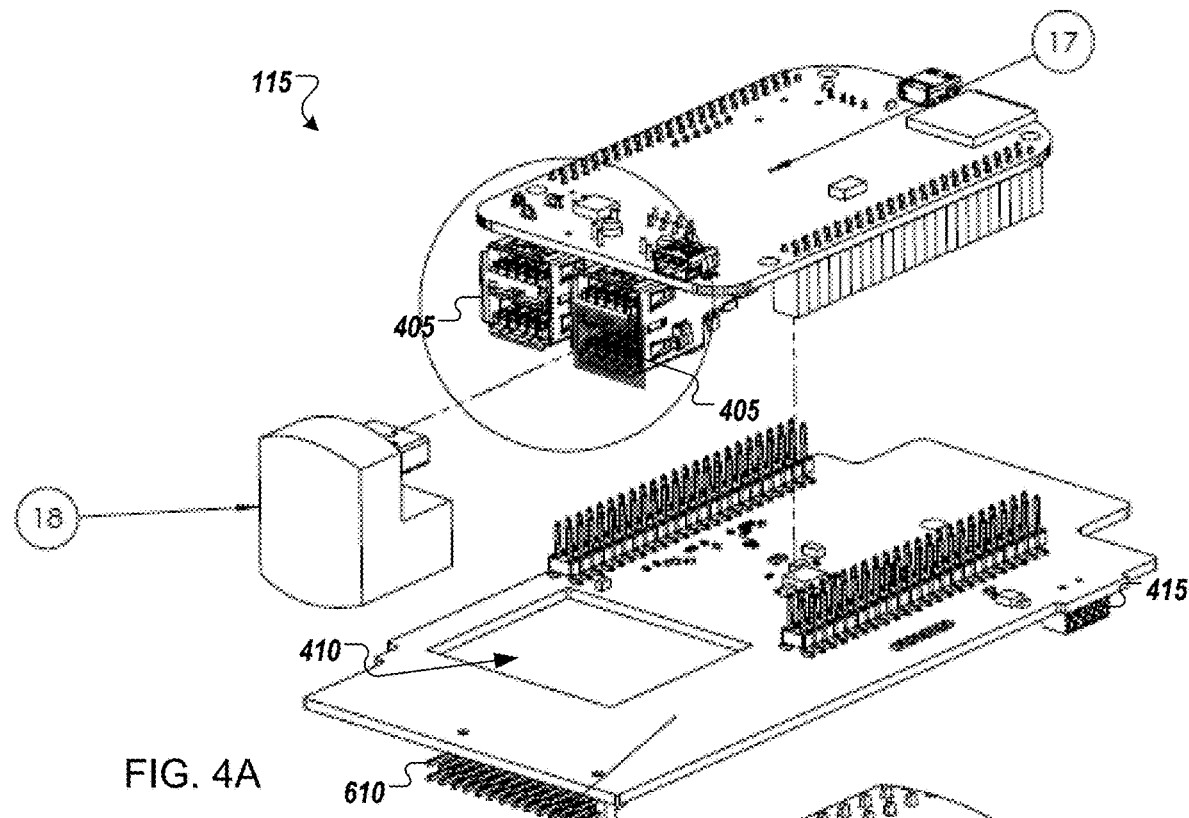
FIG. 4A illustrates an exploded perspective view of an on-board computing subassembly of a data acquisition module in accordance with aspects of the present disclosure.
Figure 4B:
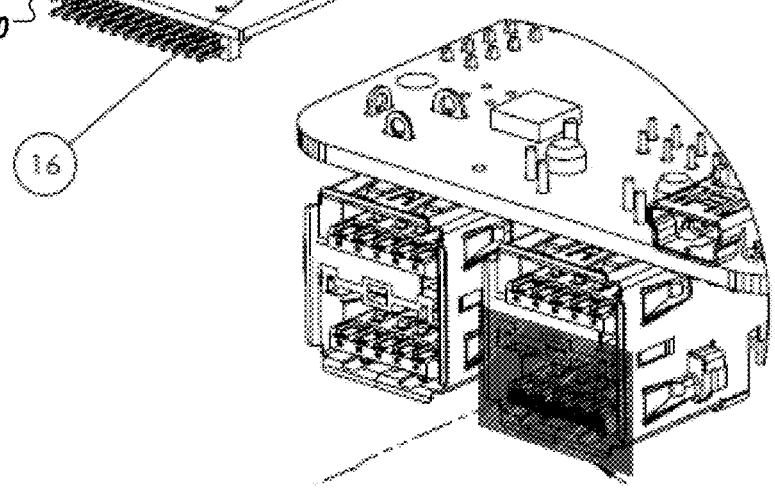
FIG. 4B illustrates an enlarged portion of the on-board computing subassembly of a data acquisition module in accordance with aspects of the present disclosure.

FIG. 4A illustrates an exploded perspective view of an on-board computing subassembly 115 of the DAM 100 in accordance with aspects of the present disclosure. FIG. 4B illustrates an enlarged portion A of the on-board computing subassembly 115 of a DAM 100 in accordance with aspects of the present disclosure. The computing subassembly 115 may include preconfigured computing board 17, which controls the on-board processing of the DAM 100. The computing board 17 may have an onboard processor, flash storage chip, a graphics accelerator, a floating-point accelerator and one or more microcontrollers. The computing board may also have connection ports 405 that may be used to connect to other peripheral devices, such as external storage or external communication devices.

The connection port 405 is not particularly limited and may include an Ethernet port, a USB port, or any other port that might be apparent to a person of ordinary skill in the art. As illustrated, the connection port 405 of the computing board 17 may have a 180-degree port alignment connector 18 installed to allow a peripheral device to be installed without increasing the overall length of the computing subassembly 115. For example, a USB antenna or transceiver may be inserted into the 180-degree port alignment connector 18 to allow the computing board 17 to communicate with another computing device, such as computing device 1305 illustrated in FIG. 13, to send and receive information. Alternatively, a USB storage device may be inserted into the 180-degree port alignment connector 18 to allow the computing board 17 to internally store data.

The computing board 17 may be coupled to the interface control board 16 that connects the computing board 17 to the circuit board 12 of the connection panel subassembly 105. As illustrated, the 180-degree port alignment connector 18 may be inserted through an opening 410 formed through the interface control board 16.

The interface control board 16 of the computing subassembly 115 may also include a pin connector 610 to connect to the circuit board 12 of the connection panel subassembly 105 as discussed below with respect to FIGS. 6A and 6B. Further, the interface control board 16 of the computing subassembly 115 may also include a User Interface (UI) connector 415 to connect to the user interface subassembly 125 discussed below.

Figure 5:
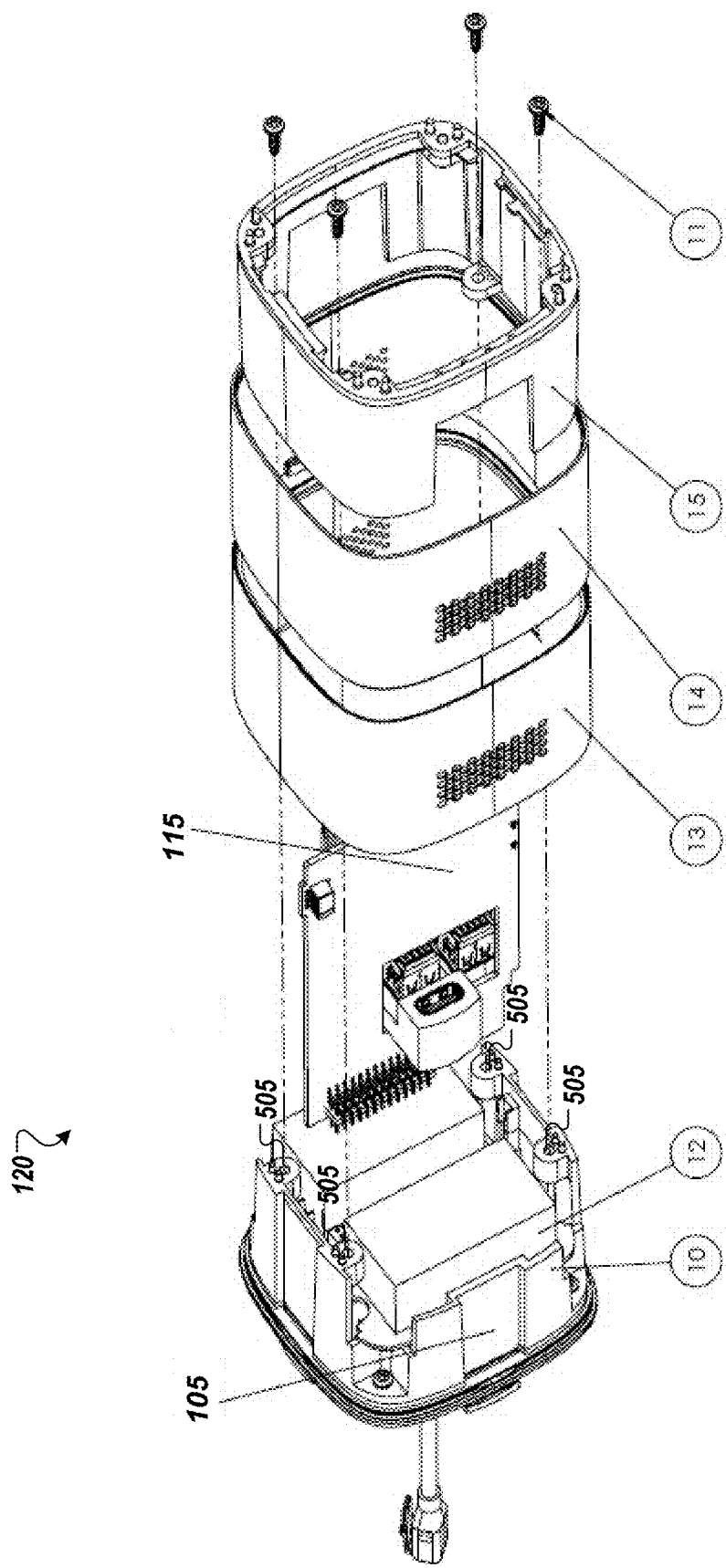
FIG. 5 illustrates an exploded perspective view of a middle subassembly of a data acquisition module in accordance with aspects of the present disclosure.

FIG. 5 illustrates an exploded perspective view of a middle subassembly 120 of a DAM 100 in accordance with aspects of the present disclosure. As illustrated, the middle subassembly 120 includes a pair of housing cover plates 13, 14 that surround a support frame 15. The support frame 15 is secured to a threaded hole 505 in the bottom of the housing 10 of the connection panel subassembly 105 by one or more screws 11. The computing subassembly 115 is located within the housing cover plates 13, 14 and the support frame 15 within the middle subassembly 120. Within middle subassembly 120, the computing subassembly 115 is coupled to the circuit board 12 of the connection panel subassembly 105 as discussed in greater detail below.

Figure 6A:
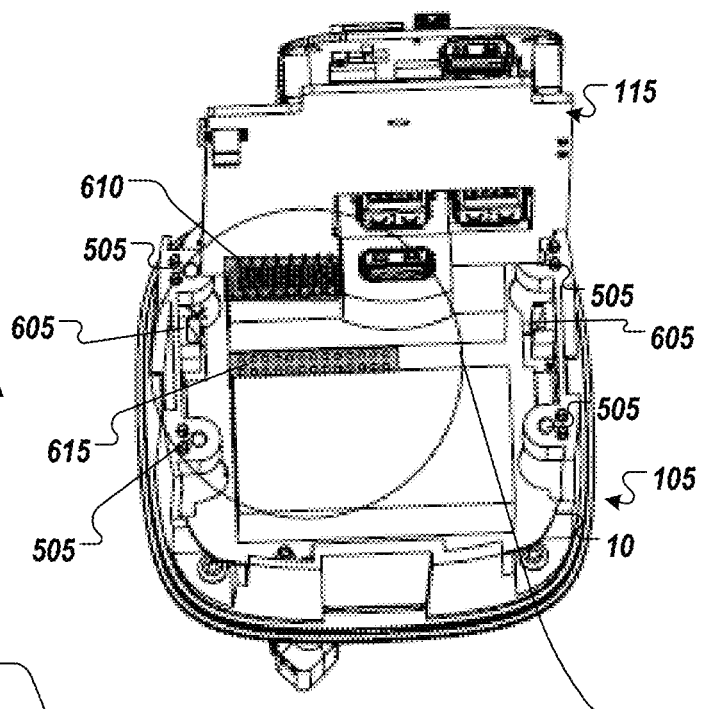
FIG. 6A illustrates a perspective view of a bottom of the connection panel subassembly disposed within the middle subassembly of a data acquisition module in accordance with aspects of the present disclosure.

FIG. 6A illustrates a perspective view of a bottom of the connection panel subassembly 105 disposed within the middle subassembly of the DAM 100 module in accordance with aspects of the present disclosure. FIG. 6B illustrates an enlarged view of a portion B of a bottom of the connection panel subassembly 105 illustrated in FIG. 6A. As discussed above, within the middle subassembly 120, the computing subassembly 115 is coupled to circuit board 12 of the connection panel subassembly 105. This coupling between the computing subassembly 115 and the connection panel subassembly 105 is both mechanical and electrical.

Figure 6B:
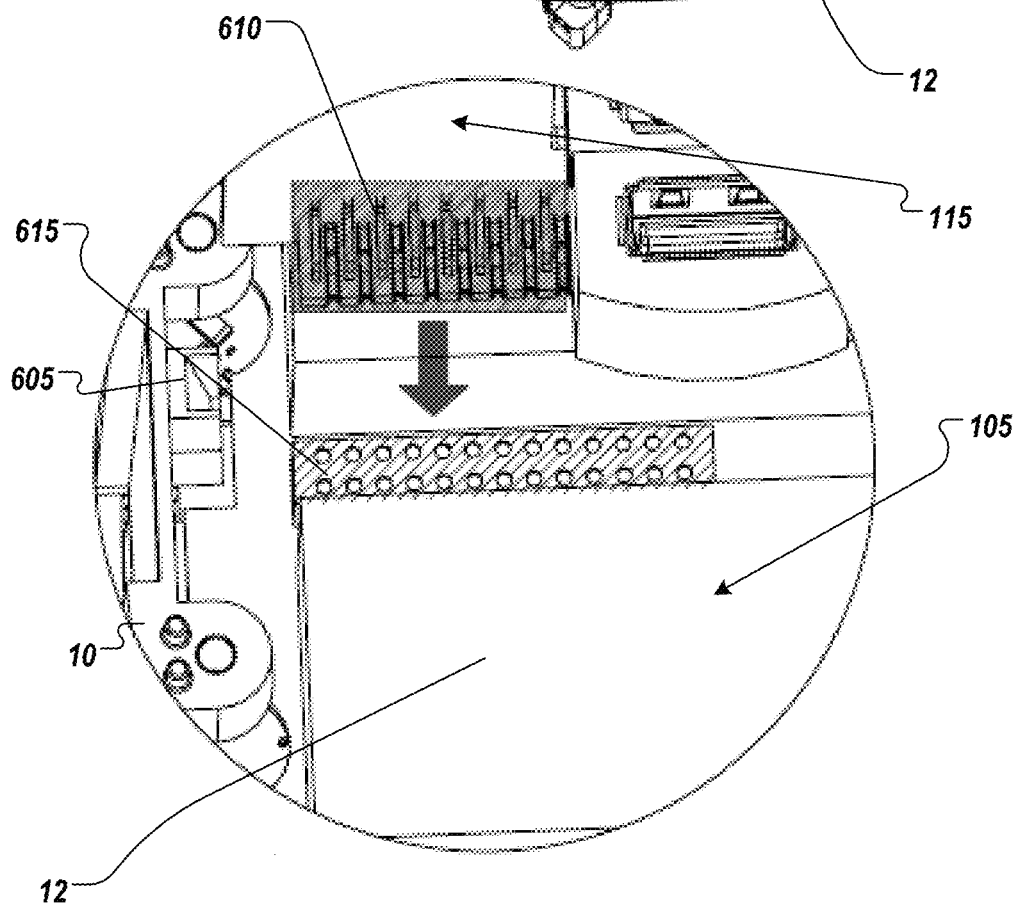
FIG. 6B illustrates an enlarged view of a portion of a bottom of the connection panel subassembly illustrated in FIG. 6A.

As illustrated in FIGS. 6A and 6B, the housing 10 of the connection panel subassembly 110 includes a pair of slots 605 into which the computing subassembly 115 is inserted to mechanically couple the computing subassembly 115 to the connection panel subassembly 105. Additionally, a pin connector 610 is provided on the computing subassembly 115. The pin connector 610 is configured to be inserted into a receiver port 615 provided on the circuit board 12 of the connection panel subassembly 105. The insertion of the pin connector 610 of the computing subassembly 115 into the receiver port 615 of the circuit board 12 of the connection panel subassembly 105 provides electrical coupling between the computing subassembly 115 and connection panel subassembly 105.

Figure 7:
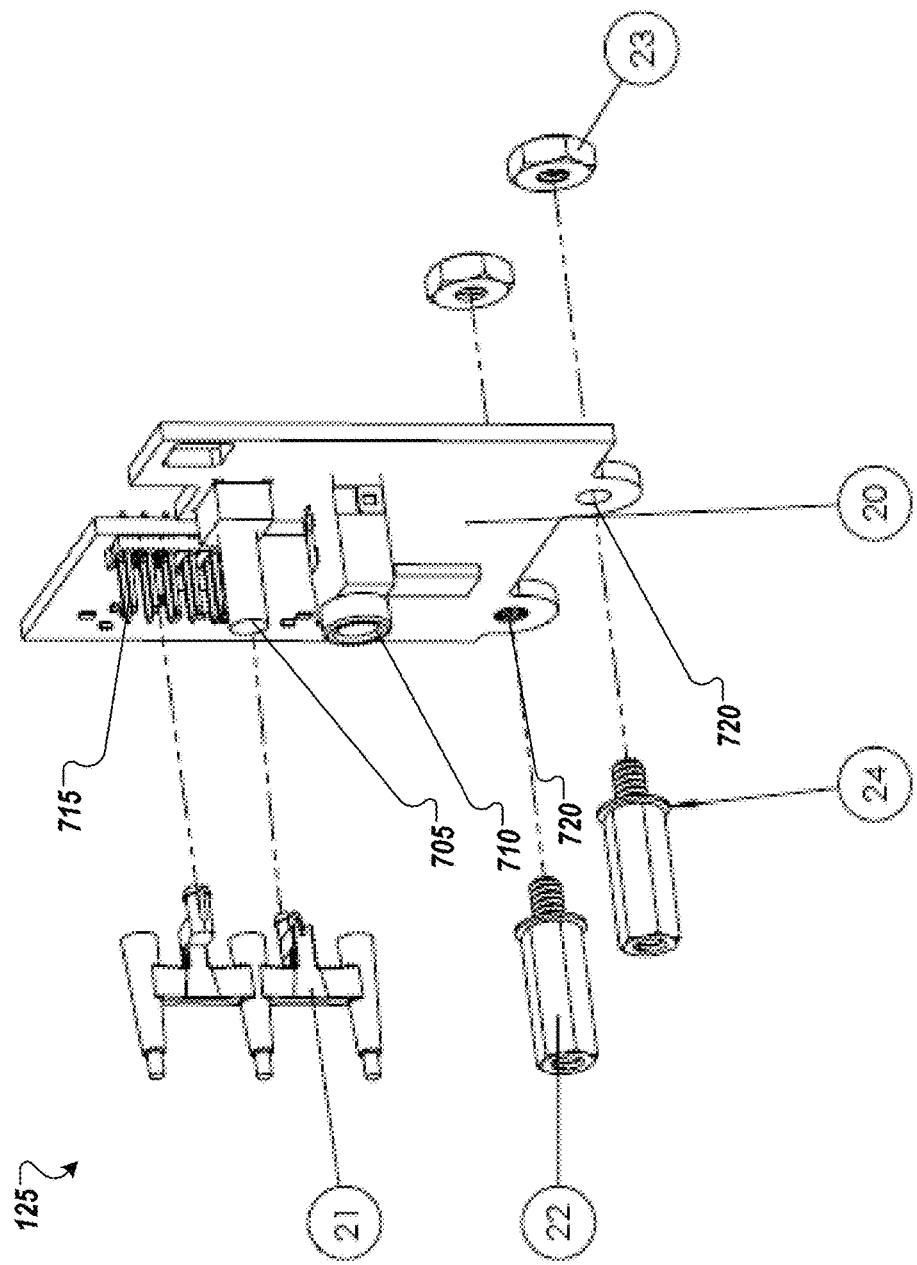
FIG. 7 illustrates an exploded perspective view of a User Interface (UI) subassembly of a data acquisition module in accordance with aspects of the present disclosure.

FIG. 7 illustrates an exploded perspective view of a User Interface (UI) subassembly 125 of the DAM 100 in accordance with aspects of the present disclosure. The UI subassembly 125 may include a circuit board 20 that processes received output from the computing subassembly 115 to be displayed to the user and received input from the user to be sent to the computing subassembly 115. The UI subassembly 125 may be electrically coupled to the computing subassembly 115 by a pin connector 715 configured to be inserted into the UI connector 415 of the computing subassembly 115.

The UI subassembly 125 may also include an output device 21 that may be used to display information or indications to a user. For example, the output device 21 may be an LED light bar of one or more LEDs that can be used to indicate status or state information to the user. However, in other example implementations the output device may be a display screen, such as an LCD screen, an LED screen, or any other display device that might be apparent to a person of ordinary skill in the art.

The UI subassembly 125 may also include one or more input devices 705, 710 that may be used to receive input data or information from a user. As illustrated in FIG. 7, the input device 705 may be a button or control interface that can be used by a user to input data or information without using a separate computing device. Further, the input device 710 may be a control port or data port (e.g., a serial port, a USB port, an HDMI port, etc.) that could be used to control or program the DAM 100 using a separate computing device, such as computing device 1305 illustrated in FIG. 13. However, other configurations using more or less input devices or different combinations of input devices may be used in the UI subassembly 125 that may be apparent to a person of ordinary skill in the art.

The UI subassembly 125 may also include structural components 22, 24, 23 that may be used to support the UI subassembly 125 and mechanically couple the UI subassembly 125 to the DAM 100. As illustrated, structural component 22 is a standoff screw that is inserted through a hole 720 through the circuit board 20 of the UI subassembly 125. Each standoff screw 22 may be inserted through a washer 24 and engage a nut 23 to hold the circuit board 20 on the standoff screws 22.

Figure 8:
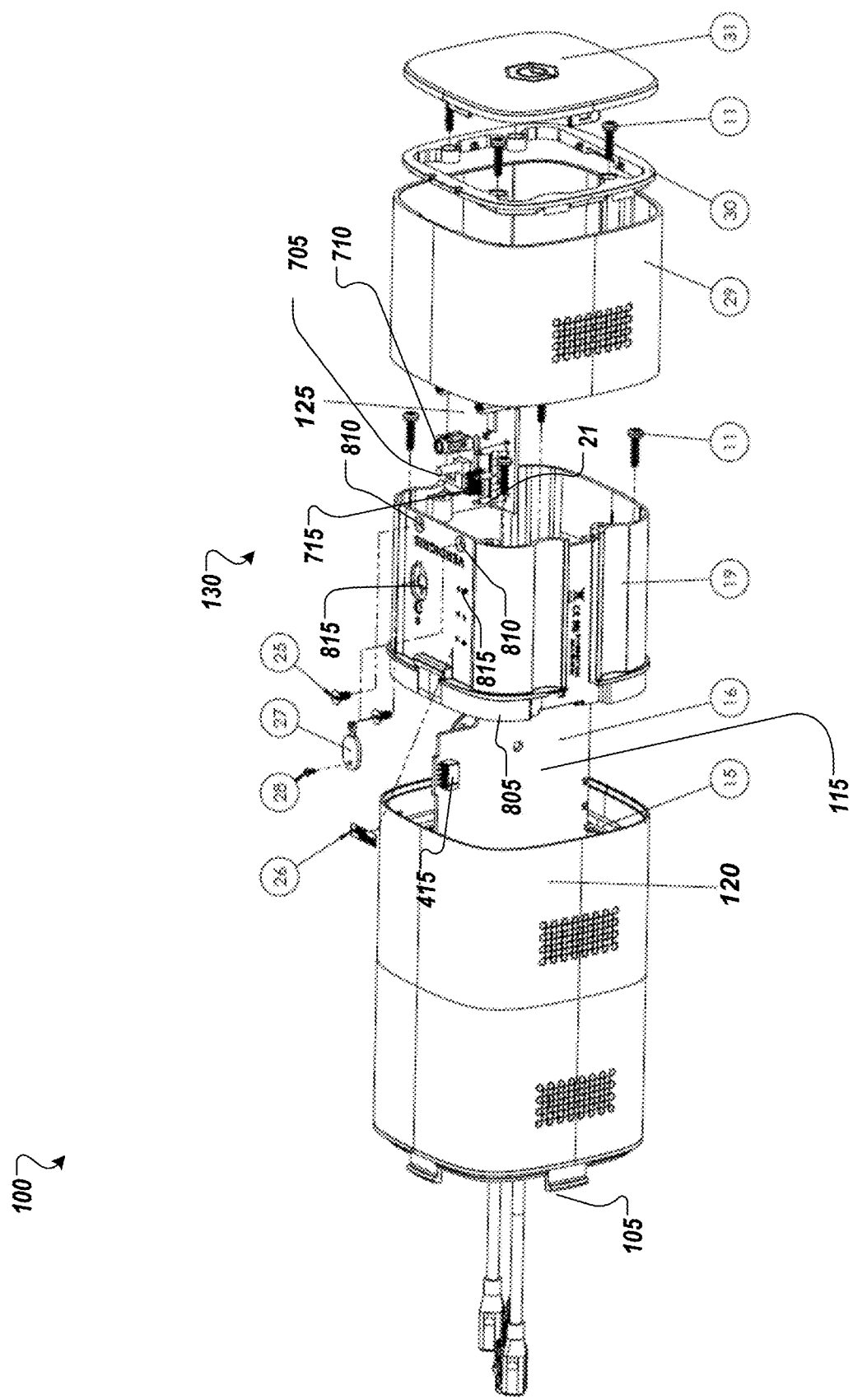
FIG. 8 illustrates an exploded perspective view of a bottom subassembly of a data acquisition module in accordance with aspects of the present disclosure.

FIG. 8 illustrates an exploded perspective view of a bottom subassembly 130 of the DAM 100 in accordance with aspects of the present disclosure. As illustrated, the bottom subassembly 130 encloses the UI subassembly 125. The pin connector 715 of the UI subassembly 125 may be inserted into the UI connector 415 of the interface control board 16 of the computing subassembly 115 to electrically couple the UI subassembly 125 to the computing subassembly 115.

The bottom subassembly 130 may include a hidden housing 19 that the UI subassembly 125 is mechanically coupled to and a sliding plate 29 configured to surround the hidden housing 19 to selectively obscure the hidden housing 19. The hidden housing 19 may include recessed edge 805 configured to be inserted within the support frame 15 of the middle subassembly 120 and screws 11 may be used to mechanically couple the bottom subassembly 130 to the middle subassembly 120.

The hidden housing 19 may also include screw holes 810 through which screws 25 may be inserted. The screws 25 inserted through the screw holes 810 may engage the standoff screws 22 of the UI subassembly 125 to secure the UI subassembly 125 within the hidden housing 19. The hidden housing 19 may also include one or more openings 815 to expose the input devices 705, 710 and the output device 21 of the UI subassembly 125. In some example implementations, a removable plug 27 may selectively cover some of the openings 815 and secure it in place by a set screw or machine screw 28. Additionally, in some example implementations, a mandatory notice decal 26 (e.g., a FCC compliance decal, model no. decal, etc.) may be applied to the hidden housing 19.

The bottom subassembly 130 may also include an end plate 30 mechanically coupled to the hidden housing 19 by one or more screws 11. An end cover 31 may snap onto the end plate 30 to enclose the interior of the DAM 100 to prevent debris from entering the DAM 100 during normal operations.

Figure 9:
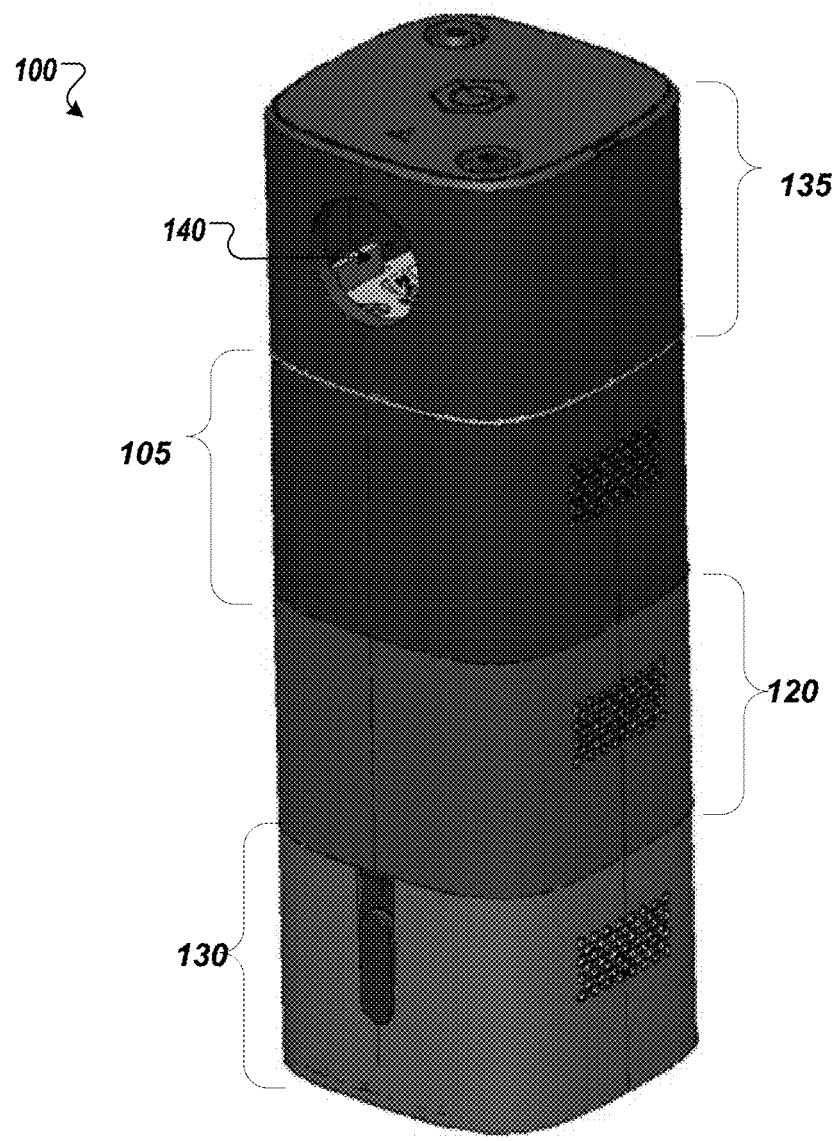
FIG. 9 illustrates a perspective view of a data acquisition module in accordance with aspects of the present disclosure.

FIG. 9 illustrates a perspective view of the DAM 100 in accordance with aspects of the present disclosure. As illustrated in FIG. 9, the DAM 100 may also include a cover 135 that encloses the signal cables 3 and terminal blocks 310 of the connection panel subassembly 105 to reduce dust and debris buildup. The cover 135 may include an opening 140 through which cable connectors may be passed to connect the DAM 100 to one or more sensors connected to electrified cables of a power distribution system within a building to allow smart monitoring of the power usage.

Figure 10:
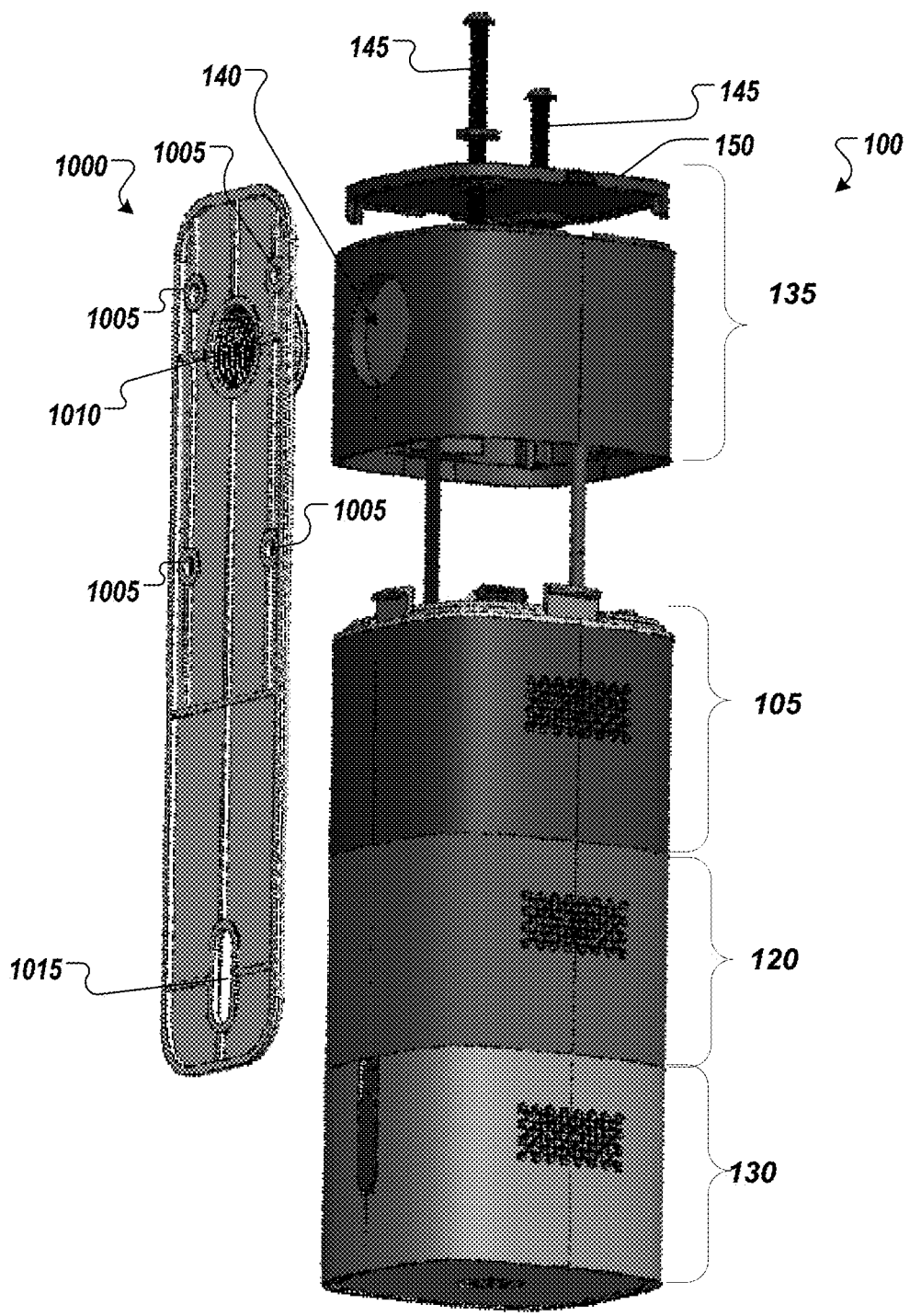
FIG. 10 illustrates a perspective view of a data acquisition module in accordance with aspects of the present disclosure configured for external attachment to a circuit panel.

FIG. 10 illustrates a perspective view of the DAM 100 in accordance with aspects of the present disclosure configured for external attachment to a circuit panel. Again, a cover 135 has been attached to the DAM 100 to enclose the signal cables 3 and terminal blocks 310 of the connection panel subassembly 105 to reduce dust and debris build up. As illustrated, the cover 135 may include an endplate 150 secured to the DAM 100 by one or more screws 145.

Further, an external mounting plate 1000 may be provided to mount the DAM 100 to the exterior of a circuit breaker panel. The external mounting plate 1000 may include a plurality of screw holes 1005 that may be used to attach the mounting plate 1000 to the exterior of a circuit breaker panel. Additionally, the external mounting plate 1000 may also include an elongated opening 1015 to allow minor adjustments of the placement of the external mounting plate 1000. The external mounting plate 1000 also includes an annular protrusion 1010 that may be configured for insertion into the opening 140 formed in the cover 135 of the DAM 100. The annular protrusion 1010 may have a threaded exterior and a retaining nut (not illustrated) may be used inside the cover 135 to secure the DAM 100 to the mounting plate 1000.

Figure 11:
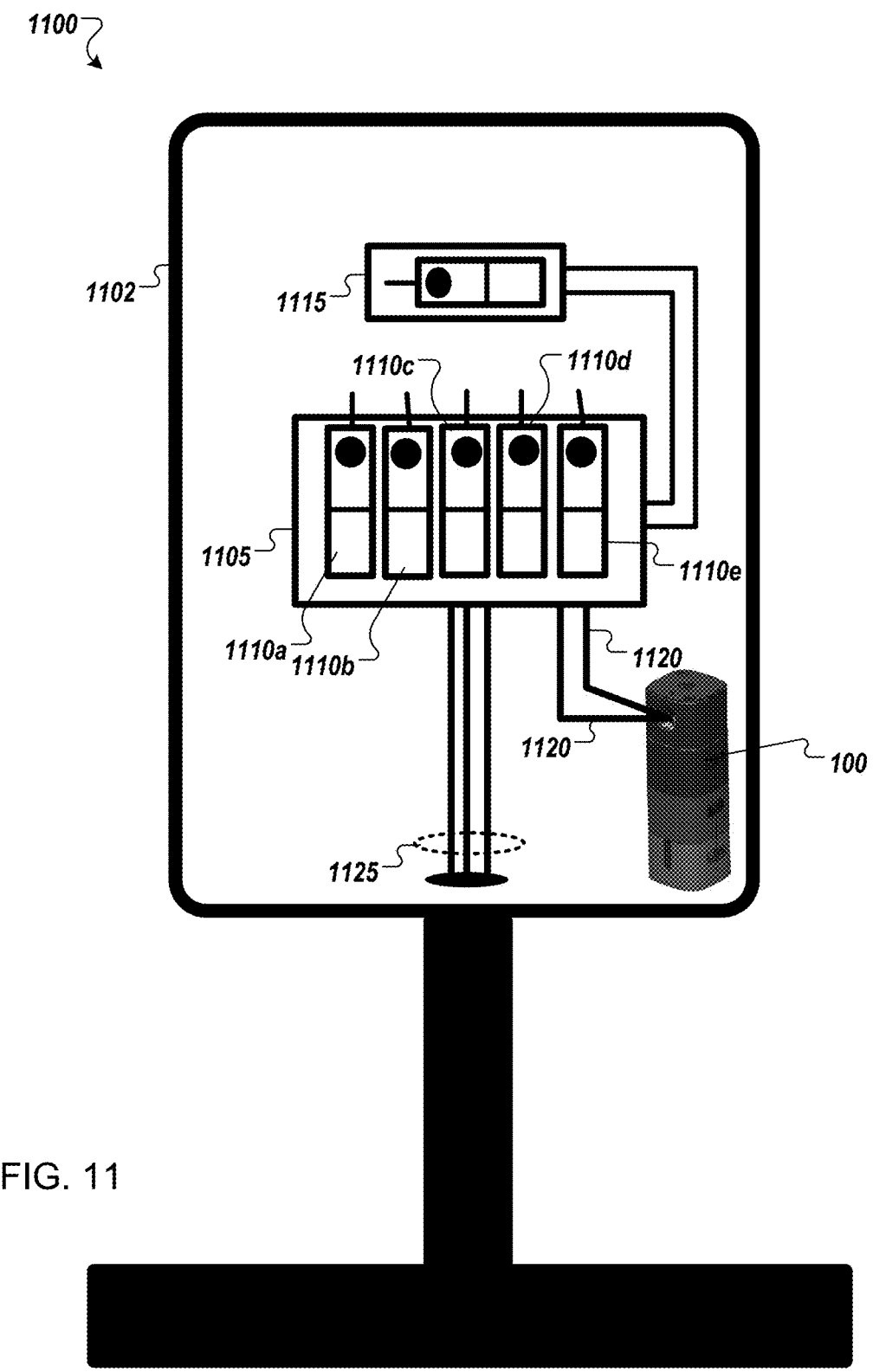
FIG. 11 illustrates a schematic view of a data acquisition module in accordance with aspects of the present disclosure installed in an electrical panel in an internal configuration.

FIG. 11 illustrates a schematic view of a DAM 100 installed in an electrical panel 1100 in an internal configuration. As illustrated, an electrical panel 1100 may include a housing 1102 and, within the housing 1102, a circuit breaker panel 1105 may be provided. The circuit breaker panel 1105 may include a plurality of circuit breakers 1110a-1110e. Each circuit breaker 1110a-1110e may electrically couple an individual electrical circuit within a building, structure or location, to power supply lines 1125. By toggling any of the circuit breakers 1110a-1110e, the associated electrical circuit may be disconnected from the power supply lines 1125 and be de-energized.

The electrical panel 1100 may also include a master breaker 1115 within the housing 1102. By toggling the master breaker 1115, all of the electrical circuits within a building, structure or location may be disconnected from the power supply lines 1125 and be de-energized.

Additionally, in FIG. 11, the DAM 100 has been installed within the housing 1102. The DAM 100 may be connected, via signal cables 1120, to one or more sensors coupled to one or more of the circuits within the building, structure or location. In some example implementations, the sensors may be electrically connected to the circuit to directly measure current through the circuit. In other example implementations, the sensors may not be directly electrically connected to the circuit, but may instead measure current through the circuit using a ferrite core and hall-effect sensor substantially surrounding an electrified cable within the circuit. In some example implementations, the sensors may be separate sensors that are attached to electrified cables exiting or entering each circuit breaker 1110a-1110e. In other example implementations, the sensors may be integrated within each circuit breaker 1110a-1110e.

The DAM 100 may process data signals received from each of the sensors via the signal cables 1120 and store the data internally. Alternatively, the DAM 100 may process the data signals received from each of the sensors via the signal cables 1120 and send the data to another computing device, such as computing device 1305 illustrated in FIG. 13, via an antenna or transceiver.

Figure 12:
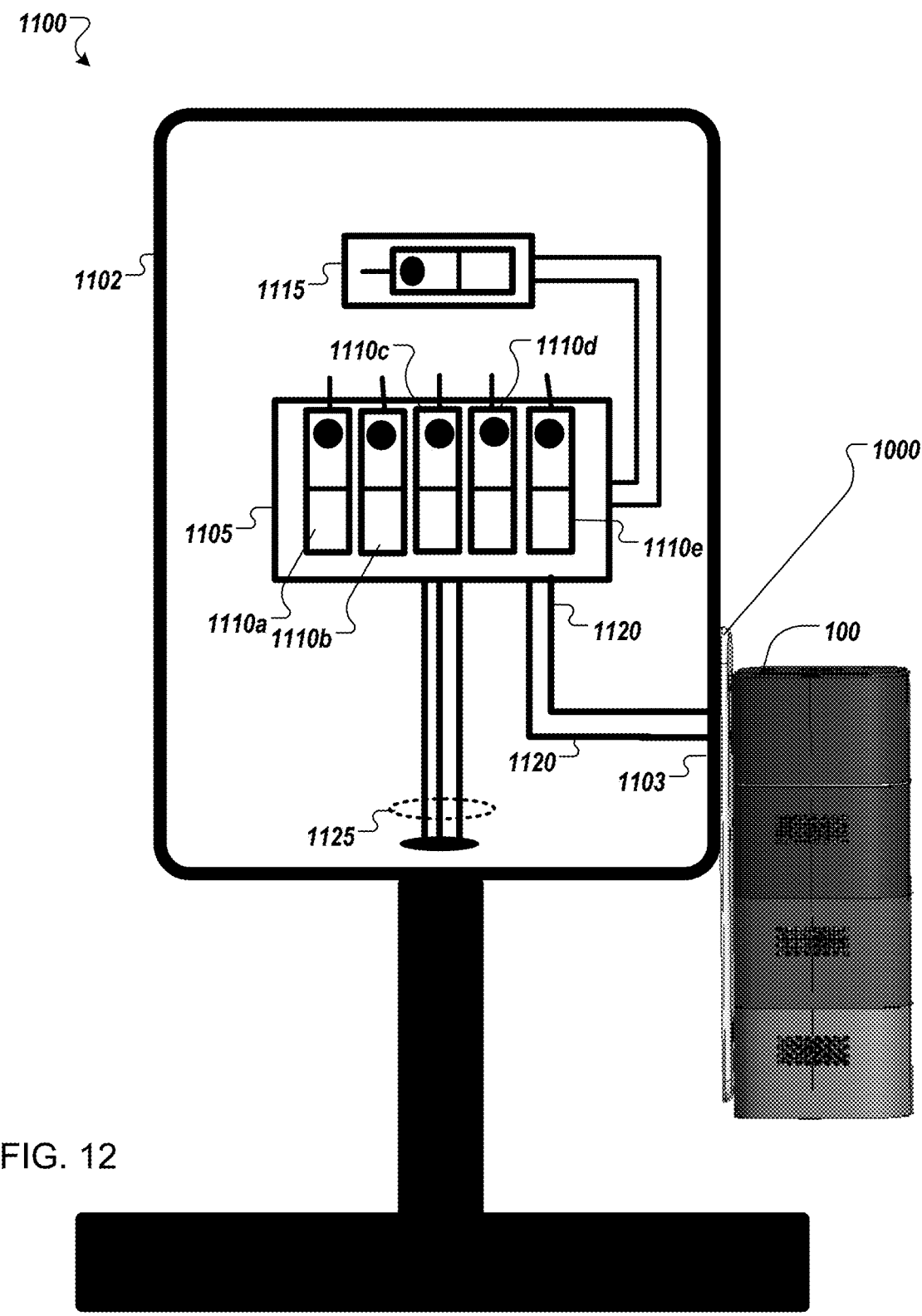
FIG. 12 illustrates a schematic view of a data acquisition module in accordance with aspects of the present disclosure installed in an electrical panel in an external configuration.

FIG. 12 illustrates a schematic view of a DAM 100 installed in an electrical panel 1100 in an external configuration. Again, the electrical panel 1100 includes a housing 1102, a circuit breaker panel 1105 including a plurality of circuit breakers 1110a-1110e, and a master breaker 1115.

In FIG. 12, the DAM 100 has been mounted to the exterior of the housing 1102 using the mounting plate 1000. In some example implementations, the DAM 100 may be mounted to the exterior of the housing 1102, prior to installation of the computing subassembly 115 with the DAM 100. As illustrated, the signal cables 1120 pass through the sidewall 1103 of the housing 1102 and the mounting plate 1000 to enter the DAM 100. Again, the DAM 100 may be connected to one or more sensors coupled to one or more of the circuits within the building, structure or location. In some example implementations, the sensors may be electrically connected to the circuit to directly measure current through the circuit. In other example implementations, the sensors may not be directly electrically connected to the circuit, but may instead measure current through the circuit using a ferrite core and hall-effect sensor substantially surrounding an electrified cable within the circuit. In some example implementations, the sensors may be separate sensors that are attached to electrified cables exiting or entering each circuit breaker 1110a-1110e. In other example implementations, the sensors may be integrated within each circuit breaker 1110a-1110e.

The DAM 100 may process data signals received from each of the sensors via the signal cables 1120 and store the data internally. Alternatively, the DAM 100 may process the data signals received from each of the sensors via the signal cables 1120 and send the data to another computing device, such as computing device 1305 illustrated in FIG. 13 via an antenna or transceiver.

FIG. 13 illustrates an example computing environment 1300 with an example computer device 1305 suitable for use in some example implementations. Computing device 1305 in computing environment 1300 can include one or more processing units, cores, or processors 1310, memory 1315 (e.g., RAM, ROM, and/or the like), internal storage 1320 (e.g., magnetic, optical, solid state storage, and/or organic), and/or I/O interface 1325, any of which can be coupled on a communication mechanism or bus 1330 for communicating information or embedded in the computing device 1305.

Computing device 1305 can be communicatively coupled to input/interface 1335 and output device/interface 1340. Either one or both of input/interface 1335 and output device/interface 1340 can be a wired or wireless interface and can be detachable. Input/interface 1335 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 1340 may include a display, television, monitor, printer, speaker, braille, or the like. In some example implementations, input/interface 1335 (e.g., user interface) and output device/interface 1340 can be embedded with, or physically coupled to, the computing device 1305. In other example implementations, other computing devices may function as, or provide the functions of, an input/interface 1335 and output device/interface 1340 for a computing device 1305. These elements may include, but are not limited to, well-known AR hardware inputs so as to permit a user to interact with an AR environment.

Examples of computing device 1305 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 1305 can be communicatively coupled (e.g., via I/O interface 1325) to external storage 1345 and network 1350 for communicating with any number of networked components, devices, and systems, including one or more computing devices of the same or different configuration. Computing device 1305 or any connected computing device can be functioning as, providing services of, or referred to as, a server, client, thin server, general machine, special-purpose machine, or another label.

I/O interface 1325 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and network in computing environment 1300. Network 1350 can be any network or combination of networks (e.g., the Internet, local area network, wide area network, a telephonic network, a cellular network, satellite network, and the like).

Computing device 1305 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 1305 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 1310 can execute under any operating system (OS) (not shown), in a native or virtual environment. One or more applications can be deployed that include logic unit 1355, application programming interface (API) unit 1360, input unit 1365, output unit 1370, Data Receiving Unit 1375, Data Processing Unit 1380, and Power Management Unit 1385, and inter-unit communication mechanism 1395 for the different units to communicate with each other, with the OS, and with other applications (not shown).

For example, Data Receiving Unit 1375, Data Processing Unit 1380, and Power Management Unit 1385 may implement one or more power management processes based on data received from one or more DAMs as described herein. The described units and elements can be varied in design, function, configuration, or implementation and are not limited to the descriptions provided.

In some example implementations, when information or an execution instruction is received by API unit 1360, it may be communicated to one or more other units (e.g., Data Receiving Unit 1375, Data Processing Unit 1380, and Power Management Unit 1385). For example, the Data Receiving Unit 1375 may receive electrical system performance data from one or more sensors associated with a DAM as described herein and provide it to the Data Processing Unit 1380. Further, the Data Processing Unit 1380 may process the received data to detect usage patterns and develop a usage model to predict demand based on various conditions. The developed usage model may be provided to the Power Management Unit 1385 that controls one more devices to change power demand based on the developed usage model.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

We claim:

1. A data acquisition module comprising:
a connection panel subassembly having a housing;
a computing device subassembly, electrically coupled to the connection panel subassembly and having a housing configured to mechanically couple to the housing of the connection panel assembly; and
a user interface subassembly, electrically coupled to the computing device subassembly and having a housing configured to mechanically couple to the housing of the computing device subassembly.

2. The data acquisition module of claim 1, wherein the housing of the connection panel subassembly is stacked on the housing of the computing device subassembly.

3. The data acquisition module of claim 2, wherein the housing of the computing device subassembly is stacked on the housing of the user interface subassembly.

4. The data acquisition module of claim 3, wherein the housing of the user interface subassembly includes a slidable panel configured to selectively allow access to a user interface of the user interface subassembly.

5. The data acquisition module of claim 4, further comprising a power light ring subassembly configured to indicate a power status of the data acquisition module.

6. The data acquisition module of claim 5, wherein the power light ring subassembly is disposed between the connection panel subassembly, and the computing device subassembly.

7. The data acquisition module of claim 1, wherein the connection panel subassembly comprises one or more data transmission cables.

8. The data acquisition module of claim 7, further comprising a cover enclosing the one or more data transmission cables.

9. The data acquisition module of claim 8, further comprising a mounting plate mechanically coupling the data acquisition module to a circuit panel of a building.

10. The data acquisition module of claim 9, wherein the mounting plate includes an opening passing therethrough, the opening engaging an opening formed in the cover and allowing the one or more data transmission cables to pass from the data acquisition module into the circuit panel.

11. A data acquisition module comprising:
a connection panel subassembly having a housing;
a user interface subassembly, electrically coupled to the connection panel subassembly and having a housing configured to mechanically couple to the housing of a computing device assembly; and a mounting plate mechanically coupling the data acquisition module to a circuit panel of a building.

12. The data acquisition module of claim 11, wherein the connection panel subassembly comprises one or more data transmission cables.

13. The data acquisition module of claim 12, further comprising a cover enclosing the one or more data transmission cables.

14. The data acquisition module of claim 13, wherein the mounting plate includes an opening passing therethrough, the opening engaging an opening formed in the cover and allowing the one or more data transmission cables to pass from the data acquisition module into the circuit panel.

15. The data acquisition module of claim 11, further comprising a computing device subassembly, electrically coupled to the connection panel subassembly and electrically coupled to the user interface subassembly and having a housing configured to mechanically couple to the housing of the connection panel subassembly between connection panel subassembly and the user interface subassembly.

16. The data acquisition module of claim 15, wherein the housing of the connection panel subassembly is stacked on the housing of the computing device subassembly.

17. The data acquisition module of claim 16, wherein the housing of the computing device subassembly is stacked on the housing of the user interface subassembly.

18. The data acquisition module of claim 17, wherein the housing of the user interface subassembly may include slidable panel configured to selectively allow access to a user interface of the user interface subassembly.

19. The data acquisition module of claim 18, further comprising a power light ring subassembly configured to indicate the power status of the data acquisition module.

20. The data acquisition module of claim 19, wherein the power light ring is disposed between the connection panel subassembly, and the computing device subassembly.

\* \* \* \* \*